United States Patent
Koskinen et al.

(10) Patent No.: US 12,532,380 B2
(45) Date of Patent: Jan. 20, 2026

(54) EARLY STATE HANDLING ASSISTANCE FOR EFFICIENT RRC STATE CHANGE

(71) Applicant: Nokia Technologies Oy, Espoo (FI)

(72) Inventors: Jussi-Pekka Koskinen, Oulu (FI); Daniela Laselva, Klarup (DK); Samuli Heikki Turtinen, Ii (FI); Jarkko Tuomo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 778 days.

(21) Appl. No.: 17/768,674

(22) PCT Filed: Oct. 13, 2020

(86) PCT No.: PCT/EP2020/078711
§ 371 (c)(1),
(2) Date: Apr. 13, 2022

(87) PCT Pub. No.: WO2021/074116
PCT Pub. Date: Apr. 22, 2021

(65) Prior Publication Data
US 2024/0114585 A1    Apr. 4, 2024

Related U.S. Application Data

(60) Provisional application No. 62/914,691, filed on Oct. 14, 2019.

(51) Int. Cl.
*H04W 76/27* (2018.01)
*H04W 76/38* (2018.01)

(52) U.S. Cl.
CPC .......... *H04W 76/27* (2018.02); *H04W 76/38* (2018.02)

(58) Field of Classification Search
CPC .............................. H04W 76/27; H04W 76/38
(Continued)

(56) References Cited

U.S. PATENT DOCUMENTS

| 9,866,425 B1 | 1/2018 | Lo ................................ 370/236 |
| 2015/0045035 A1 | 2/2015 | Nigam et al. ................. 455/436 |

(Continued)

FOREIGN PATENT DOCUMENTS

| CN | 107006058 A | 8/2017 |
| CN | 110012551 A | 7/2019 |

(Continued)

OTHER PUBLICATIONS

U.S. Appl. No. 62/822,509, filed Mar. 22, 2019.*

(Continued)

*Primary Examiner* — Faisal Choudhury
(74) *Attorney, Agent, or Firm* — McCarter & English, LLP

(57) ABSTRACT

A UE receives configuration of early state handling assistance information and determines whether early state handling assistance should be reported in a request for a connection to a network. The UE requests the connection to the network, performing one of the following: reporting the early state handling assistance from the network using RRC message(s); or not reporting the early state handling assistance from the network, by the UE using RRC message(s) without an indication of early state handling assistance. A base station transmits the configuration, receives the RRC message(s), and determines whether the message(s) include reporting of the early state handling assistance. The base station performs one of the following: for the RRC message(s) including reporting of early state handling assistance, performing RRC reconfigurations with early state handling processing; or for the RRC message(s) without reporting of early state handling assistance, performing RRC reconfigurations without the early state handling processing.

17 Claims, 8 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2018/0368018 | A1* | 12/2018 | Kim | ...................... H04W 72/23 |
| 2019/0306913 | A1 | 10/2019 | Kim et al. | |
| 2020/0305014 | A1* | 9/2020 | Kim | ...................... H04W 24/10 |
| 2020/0396633 | A1* | 12/2020 | Tseng | ................... H04W 24/10 |
| 2021/0037403 | A1* | 2/2021 | Kim | ...................... H04W 24/10 |
| 2022/0174775 | A1* | 6/2022 | Rönneke | ............... H04W 76/27 |
| 2022/0304093 | A1* | 9/2022 | Kim | ...................... H04W 76/19 |

FOREIGN PATENT DOCUMENTS

| | | | |
|---|---|---|---|
| GB | 2547028 A | 8/2017 | |
| WO | WO-2019032222 A1 * | 2/2019 | ........... H04L 5/0053 |

OTHER PUBLICATIONS

3GPP TSG-RAN WG2 #107bis, Chongqing, China, Oct. 14-18, 2019, R2-1913757, "RRC release after EDT for User Plane CIot EPS optimization", Ericsson, 5 pgs.

SA WG2 Meeting #129-Bis, Nov. 26-30, 2018, West Palm Beach, Florida, US, S2-1811947, "KI2 Pending DL data at AS RAI", Ericsson, 15 pgs.

"Views on UE power saving", Qualcomm Incorporated, 3GPP TSG RAN WG1 Meeting #94, R1-1809462, Aug. 2018, 11 pages.

RP-181463, CATT et al., "New SID: Study on UE Power Saving in NR", 3GPP TSG RAN Meetings #80, La Jolla, USA, Jun. 11-14, 2018.

3GPP TR 38.840 V16.0.0 (Jun. 2019, Study on User Equipment (UE) power saving in NR.

3GPP TS 38.300 V15.7.0 (Sep. 2019), "NR and NG-RAN Overall Description".

3GPP TS 38.331 V15.7.0 (Sep. 2019), "Radio Resource Control (RRC) protocol specification".

RP-182894, ZTE Corporation, Sanechips, "New work item: 2-step RACH for NR", 3GPP TSG RAN Meeting #82, Sorrento, Italy, Dec. 10-13, 2018.

RP-191582, CATT and CAICT, New Wid: Ue Power Saving in NR, 3GPP TSG RAN Meetings #83, Shenzhen, China, Mar. 18-21, 2019.

3GPP TS 38.304 V15.5.0 (Sep. 2019), User Equipment (UE) procedures in Idle mode and RRC Inactive state.

RP-191607, CATT and CAICT, "New WID: UE Power Saving in NR", 3GPP TSG RAN Meetings #84, Newport Beach, USA, Jun. 3-6, 2019.

* cited by examiner

EARLY STATE HANDLING ASSISTANCE FOR EFFICIENT RRC STATE CHANGE

CROSS REFERENCE TO RELATED APPLICATION

This patent application is a U.S. National Stage application of International Patent Application Number PCT/EP2020/078711 filed Oct. 13, 2020, which is hereby incorporated by reference in its entirety, and claims priority to U.S. provisional application 62/914,691 filed Oct. 14, 2019, which is hereby incorporated by reference in its entirety.

TECHNICAL FIELD

This invention relates generally to wireless communications and, more specifically, relates to radio resource control (RRC) states for user equipment (UEs), which connect to a wireless network via base stations.

BACKGROUND

For radio resource control (RRC), a user equipment (UE) has several main RRC states: an idle state, referred to as RRC Idle (or RRC IDLE); a connected state, referred to as RRC Connected (or RRC CONNECTED); and an inactive state, referred to as RRC Inactive (or RRC INACTIVE). Each one of these states has a set of features. For instance, the RRC Idle state is useful for power saving, but does allow for a small amount of reception from the network. Uplink transmissions are possible, however, only when the UE requests connection or when the UE is in an RRC Connected state. In the RRC Connected state, the UE has all communication possibilities available, but this is a state involving much higher power than the RRC Idle state. For the RRC Inactive state, this may enable similar UE power saving as in the RRC Idle state, but the RRC Inactive state also allows a much faster resume of the connection with the network, thus reducing initial access delay of data transfer.

Because the RRC Idle state and the RRC Inactive state can provide better UE power saving opportunities, it is beneficial for the UE to stay in these states if possible. The transition, however, from the RRC Idle state to the RRC Connected state is relatively time-consuming, and it requires signaling between the UE and network. While the transition from the RRC Inactive state is less time-consuming, it still requires some time and requires similar signaling.

BRIEF SUMMARY

This section is intended to include examples and is not intended to be limiting.

In an exemplary embodiment, a method is disclosed that includes receiving, by a user equipment in a wireless network, a configuration of early state handling assistance information from the network. The method includes determining, by the user equipment and using at least the configuration, whether early state handling assistance should be reported to the network in a request for a connection to the network. The method also includes requesting by the user equipment the connection to the network and, responsive to the determination, performing one of the following in the requesting: reporting by the user equipment the early state handling assistance from the network using one or more radio resource control messages; or not reporting by the user equipment the early state handling assistance from the network, at least by the user equipment using one or more radio resource control messages without an indication of early state handling assistance.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, by a user equipment in a wireless network, a configuration of early state handling assistance information from the network; determining, by the user equipment and using at least the configuration, whether early state handling assistance should be reported to the network in a request for a connection to the network; requesting by the user equipment the connection to the network; and responsive to the determination, performing one of the following in the requesting: reporting by the user equipment the early state handling assistance from the network using one or more radio resource control messages; or not reporting by the user equipment the early state handling assistance from the network, at least by the user equipment using one or more radio resource control messages without an indication of early state handling assistance.

An exemplary computer program product includes a computer-readable storage medium bearing computer program code embodied therein for use with a computer. The computer program code includes: code for receiving, by a user equipment in a wireless network, a configuration of early state handling assistance information from the network; code for determining, by the user equipment and using at least the configuration, whether early state handling assistance should be reported to the network in a request for a connection to the network; code for requesting by the user equipment the connection to the network; and code, responsive to the determination, for performing one of the following in the requesting: reporting by the user equipment the early state handling assistance from the network using one or more radio resource control messages; or not reporting by the user equipment the early state handling assistance from the network, at least by the user equipment using one or more radio resource control messages without an indication of early state handling assistance.

In another exemplary embodiment, an apparatus comprises means for performing: receiving, by a user equipment in a wireless network, a configuration of early state handling assistance information from the network; determining, by the user equipment and using at least the configuration, whether early state handling assistance should be reported to the network in a request for a connection to the network; requesting by the user equipment the connection to the network; and responsive to the determination, performing one of the following in the requesting: reporting by the user equipment the early state handling assistance from the network using one or more radio resource control messages; or not reporting by the user equipment the early state handling assistance from the network, at least by the user equipment using one or more radio resource control messages without an indication of early state handling assistance.

In an exemplary embodiment, a method is disclosed that includes transmitting, by a base station in a wireless network and toward a user equipment in the network, a configuration of early state handling assistance information. The method includes receiving one or more radio resource control messages from the user equipment in a request for a connection to the network, and determining whether the received one or more radio resource control messages comprise reporting of early state handling assistance. The method also includes, responsive to the determination, performing one of the following: for the one or more radio resource control messages comprising the reporting of early state handling assistance, performing radio resource control reconfigurations with early state handling processing; or for the one or more radio resource control messages without the reporting of early state handling assistance, performing radio resource control reconfigurations without the early state handling processing.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: transmitting, by a base station in a wireless network and toward a user equipment in the network, a configuration of early state handling assistance information; receiving one or more radio resource control messages from the user equipment in a request for a connection to the network; determining whether the received one or more radio resource control messages comprise reporting of early state handling assistance; and responsive to the determination, performing one of the following: for the one or more radio resource control messages comprising the reporting of early state handling assistance, performing radio resource control reconfigurations with early state handling processing; or for the one or more radio resource control messages without the reporting of early state handling assistance, performing radio resource control reconfigurations without the early state handling processing.

An exemplary computer program product includes a computer-readable storage medium bearing computer program code embodied therein for use with a computer. The computer program code includes: code for transmitting, by a base station in a wireless network and toward a user equipment in the network, a configuration of early state handling assistance information; code for receiving one or more radio resource control messages from the user equipment in a request for a connection to the network; code for determining whether the received one or more radio resource control messages comprise reporting of early state handling assistance; and code, responsive to the determination, for performing one of the following: for the one or more radio resource control messages comprising the reporting of early state handling assistance, performing radio resource control reconfigurations with early state handling processing; or for the one or more radio resource control messages without the reporting of early state handling assistance, performing radio resource control reconfigurations without the early state handling processing.

In another exemplary embodiment, an apparatus comprises means for performing: transmitting, by a base station in a wireless network and toward a user equipment in the network, a configuration of early state handling assistance information; receiving one or more radio resource control messages from the user equipment in a request for a connection to the network; determining whether the received one or more radio resource control messages comprise reporting of early state handling assistance; and responsive to the determination, performing one of the following: for the one or more radio resource control messages comprising the reporting of early state handling assistance, performing radio resource control reconfigurations with early state handling processing; or for the one or more radio resource control messages without the reporting of early state handling assistance, performing radio resource control reconfigurations without the early state handling processing.

DETAILED DESCRIPTION OF THE DRAWINGS

Figure 1:
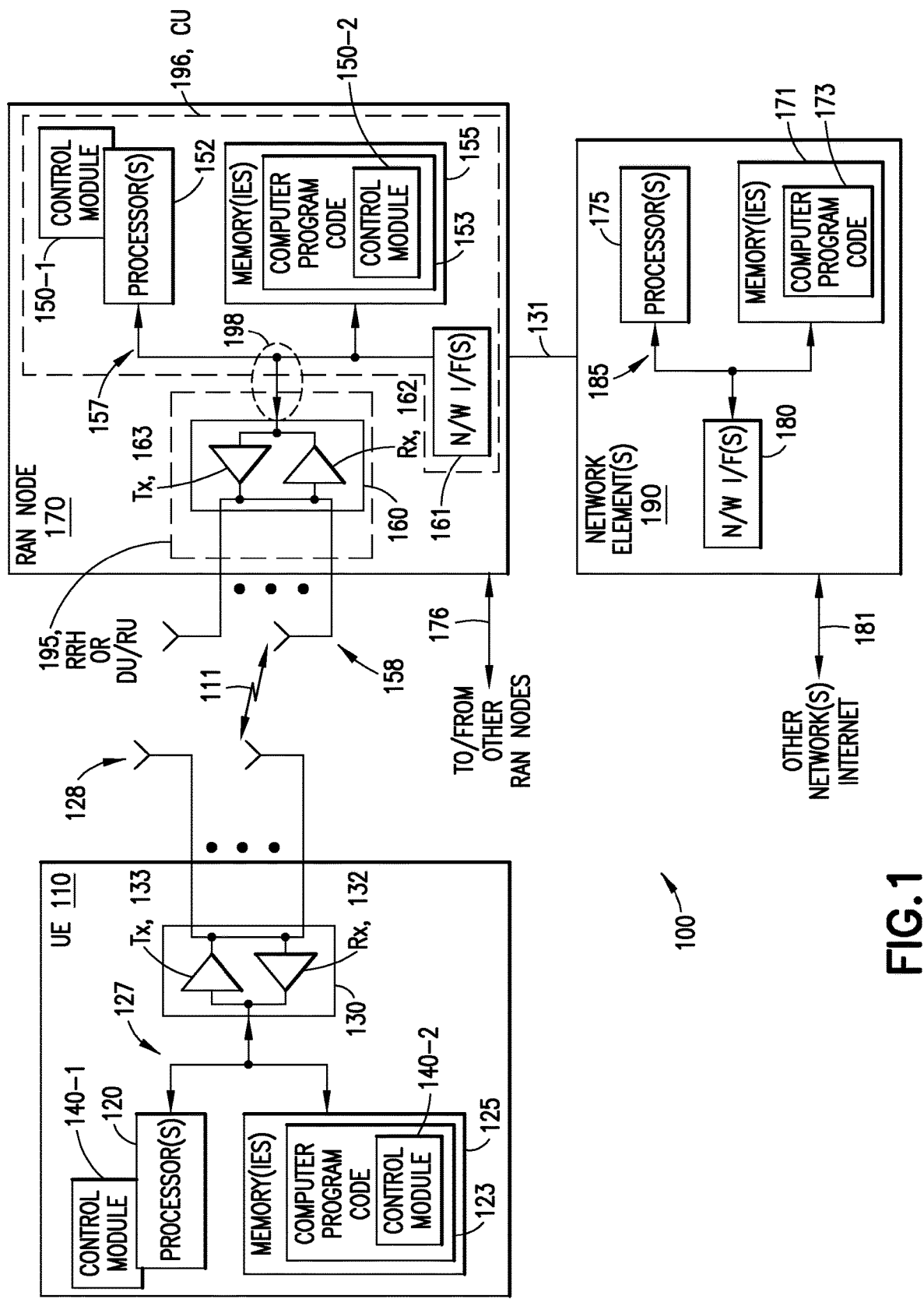
FIG. 1 is a block diagram of one possible and non-limiting exemplary system in which the exemplary embodiments may be practiced.

The following abbreviations that may be found in the specification and/or the drawing figures are defined as follows:
3GPP third generation partnership project
5G fifth generation
5GC 5G core network AMF access and mobility management function
AS access stratum
BSR buffer status report
BWP bandwidth part
CCCH common control channel
CIoT cellular IoT
CP control plane
CU central unit
DL downlink (from network to user equipment)
DRB data radio bearer
DRX discontinuous reception
DU distributed unit
EDT early data transmission
efeMTC even further enhanced MTC
eNB (or eNodeB) evolved Node B (e.g., an LTE base station)
EN-DC E-UTRA-NR dual connectivity en-gNB or En-gNB node providing NR user plane and control plane protocol terminations towards the UE, and acting as secondary node in EN-DC
E-UTRA evolved universal terrestrial radio access, i.e., the LTE radio access technology
E-UTRAN evolved universal terrestrial radio access network
FTP file transfer protocol
gNB (or gNodeB) base station for 5G/NR, i.e., a node providing NR user plane and control plane protocol terminations towards the UE, and connected via the NG interface to the 5GC
IE information element
I/F interface
IoT Internet of things
I-RNTI Inactive-RNTI
LCG0 logical channel group 0 (zero)
LCH logical channel
LTE long term evolution
MAC medium access control
MBB mobile broadband
MME mobility management entity
MTC machine-type communication
NB-IoT narrow band-IoT
ng or NG next generation
ng-eNB or NG-eNB next generation eNB
NR new radio
N/W or NW network
PDCP packet data convergence protocol
PDU protocol data unit
PHY physical layer
PPI power preference indicator
PRACH physical random access channel
PUSCH physical uplink shared channel
QoS quality of service
RA random access
RAI release assistance indicator
RAN radio access network
Rel release
RLC radio link control
RNTI radio network temporary identifier
RRH remote radio head
RRC radio resource control
RU radio unit
Rx receiver
SCell secondary cell
SDAP service data adaptation protocol
SDT small data transmission
SGW serving gateway
SI system information
SMF session management function
SRB signaling radio bearer
TCP/IP transmission control protocol/Internet protocol
TS technical specification
Tx transmitter
UE user equipment (e.g., a wireless, typically mobile device)
UL uplink (from a user equipment toward the network)
UPF user plane function
UTRAN universal terrestrial radio access network
WI work item The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for early state handling assistance for efficient RRC state change. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), (gNB-CU)) of the RAN node 170 to the RRH/DU 195. Reference 198 also indicates those suitable network link(s).

It is noted that the RAN node 170 is referred to below mainly as a gNB 170. This is for ease of reference only, and the RAN node 170 may be or include other elements as previously described.

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

The exemplary embodiments herein propose enhancements of the initial access procedure of 5G NR systems for UEs in the RRC IDLE and Inactive state, aided by UE assistance, with the aim of more efficient RRC state transitions. An introduction to the technical area is provided, and then exemplary embodiments are described in more detail.

As an introduction to this technical area, the topic of efficient transitions has been under discussion in the Rel-16 power saving study (RP-181463, TR 38.840), recently finalized by RAN2. See RP-181463, CATT et al., "New SID: Study on UE Power Saving in NR", 3GPP TSG RAN Meetings #80, La Jolla, USA, 11-14 Jun. 2018; and 3GPP TR 38.840 V16.0.0 (2019-06), "Study on User Equipment (UE) power saving in NR (Release 16)". Specifically, at the RAN2 #106 meeting (May 2019), it was agreed that UE assistance for power saving should be part of the work item as shown in the text below ("UE provides UE assistance to transition out of RRC Connected. Details on signalling and whether the UE provides release assistance and/or state preference can be discussed in WI phase"). Therefore, the following dedicated objective has been confirmed by the RAN Plenary #84 (June 2019) as part of corresponding Rel-16 work item (see RP-191607, which is a revision of RP-191582):

Specify a mechanism for a UE to indicate its preference of transitioning out of RRC CONNECTED state, which includes the provisioning of UE assistance to aid the network for UE transition out of RRC Connected state. Details on signalling and whether the UE provides release assistance and/or state preference are to be discussed in WI phase. The following potential UE assistance information was captured in the 3GPP TR 38.840:

Mobility history information

Power Preference Indicator (PPI)

to enable UE assistance information including UE's preferred C-DRX configuration/parameters.

Whether to enable UE assistance information including UE's preferred BWP configuration/parameters Whether to enable UE assistance information including UE's preferred SCell related configuration (e.g. considering (a) based on SCell index, (b) SCell (de)activation, (c) CA (de)activation, (d) number of DL cells and/or UL cells, and/or (e) maximum number of Scell to be configured)

The RP-191607 (RP-191607, CATT and CAICT, "New WID: UE Power Saving in NR", 3GPP TSG RAN Meetings #84, Newport Beach, USA, 3-6 Jun. 2019) is a revision of RP-191582 (RP-191582, CATT and CAICT, "New WID: UE Power Saving in NR", 3GPP TSG RAN Meetings #83, Shenzhen, China, 18-21 Mar. 2019).

Figure 2:
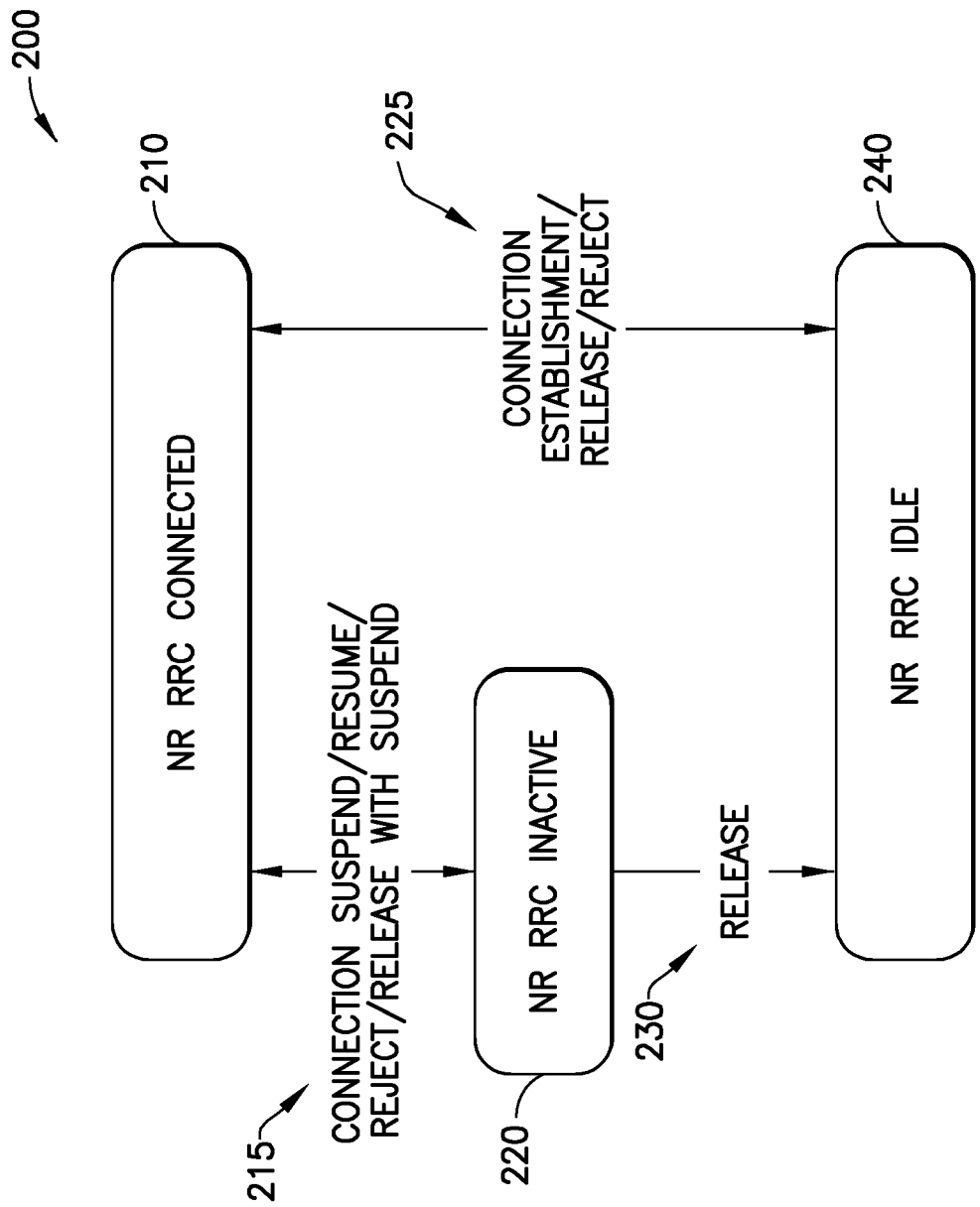
FIG. 2 is a block diagram of an NR RRC state machine with RRC state transitions in NR Rel-15.

Rel-15 NR introduced a new RRC state, referred to as RRC INACTIVE (see 3GPP TS 38.300/38.304) that allows a faster transition to RRC CONNECTED (about 10 ms control plane, CP, delay), ensuring a quicker resume of the RRC connection. See 3GPP TS 38.300 V15.7.0 (2019-09), "NR and NG-RAN Overall Description"; and 3GPP TS 38.304 V15.5.0 (2019-09), "User Equipment (UE) procedures in Idle mode and RRC Inactive state". The CP latency is significantly improved compared to a UE in RRC IDLE, which takes about 76 ms for transitioning to RRC CONNECTED. Thus, although in Rel-15 a UE in the RRC INACTIVE state requires first a transition to RRC CONNECTED any time the UE needs to perform data transmission, such transmissions can be started with a much lower initial access delay and lower associated signaling overhead as compared to a UE in an RRC IDLE state. The reduced control signaling for requesting and obtaining the resume of a suspended RRC connection obviously results in UE power saving. At the same time, a UE in an RRC INACTIVE state is able to achieve similar power savings as in the RRC IDLE state, benefiting from, e.g., larger periods of paging monitoring and relaxed RRM measurements compared to RRC CONNECTED. The NR RRC state machinery is illustrated in FIG. 2, which is a block diagram of an NR RRC state machine 200 with RRC state transitions in NR Rel-15. In FIG. 2, there is an NR RRC CONNECTED state 210, an NR RRC INACTIVE state 220, and an NR RRC IDLE state 240. The connection suspend/resume/reject/release with suspend messages 215 transition the UE between the NR RRC CONNECTED state 210, and the NR RRC INACTIVE state 220. The Release message 230 transitions the UE from the NR RRC INACTIVE state 220 to the NR RRC IDLE state 240. The connection establishment/release/reject messages 225 transition the UE between the NR RRC CONNECTED state 210 and the NR RRC IDLE state 240.

It is remarked that when the gNB moves a UE to the RRC INACTIVE state 220 by sending an RRC Connection release message comprising, e.g., a Suspend indication and the associated configuration (where the message is illustrated by connection suspend/resume/rejection/release with suspend message 215), the UE Access Stratum (AS) context (referred to as UE Inactive AS Context), which is necessary for the quick resume of the connection, is maintained both at the UE side and RAN side, and this context is identified by the UE identifier, i.e. Inactive-RNTI (I-RNTI).

In Rel-15 NR uplink (UL), small data transmission (SDT) in the RRC INACTIVE state 220 is not supported, thus a UE in the RRC INACTIVE state 220 always requires a transition to the RRC CONNECTED state 210 before any data transfer. However, such support is expected to be introduced in Rel-17. This could be realized as described in Rel-14 TR 38.804, similarly to the Early Data Transmission (EDT) scheme that is supported in Rel-15 of LTE. Limited to uplink "efeMTC" scenarios, EDT during 4-step RACH allows a UE 110 to transmit up to 1000 bits in Msg3 of a random access procedure using a special EDT PRACH preamble, where the use of the special preamble indicates the presence of up to 1000 bits in the UE buffer.

The UE benefits from being in the most suitable RRC state to meet the QoS requirements, while extending the battery life. However, the optimal RRC state for a UE depends on various aspects including UE mobility, data transmission activity, network load situation, QoS requirements, and the like. On the one hand, RRC INACTIVE or IDLE states provide better UE power saving opportunities than does the RRC CONNECTED state, so these RRC states should be preferred during periods with no data activity. On the other hand, the RRC CONNECTED state allows the fastest data transmission thanks to dispensable RRC state transition, thus avoiding the associated control plane procedures. Hence, the RRC CONNECTED state 210 should be preferred during the periods of data delivery that may come with some burstiness.

Figure 3:
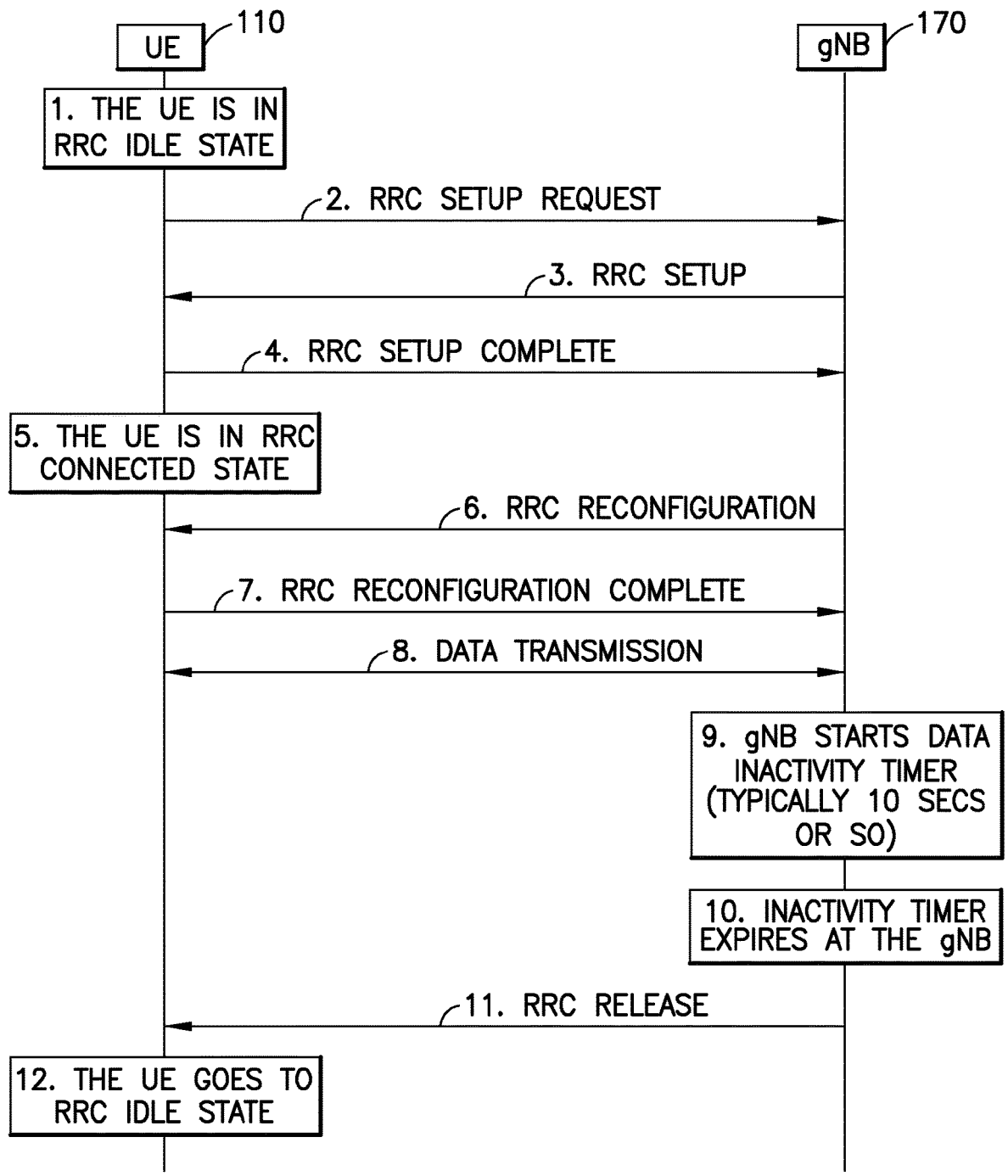
FIG. 3 is a signaling diagram of an RRC state transition handling framework.

Currently, the network 100 controls the RRC state transitions of the served UEs based on timers, such as the RRC connection release/inactivity timers, which are running at the network side to detect data inactivity. This is depicted in FIG. 3, which is a signaling diagram of an RRC state transition handling framework. These timers in FIG. 3 are typically set in the orders of a few seconds in commercial LTE deployments and are applied to any UE in the cell.

In FIG. 3, in step 1, the UE is in an RRC IDLE state 240. The UE 110 in step 2 sends an RRC Setup Request message to the gNB 170. The gNB 170 in step 3 responds with an RRC Setup message via signaling. The UE 110 in step 4 responds with an RRC Setup Complete message. The UE transitions to the RRC CONNECTED state 210 in step 5.

The gNB 170 in step 6 sends an RRC Reconfiguration message to the UE 110, which responds with an RRC Reconfiguration Complete message in step 7. There is data transmission between the UE 110 and the gNB 170 in step 8.

In step 9, the gNB 170 starts a data inactivity timer, e.g., due to lack of data from the UE. The data inactivity timer is typically 10 seconds (secs) or so. This data inactivity timer expires in step 10. In step 11, the gNB 170 consequently sends an RRC Release message, and the UE goes to an RRC IDLE state 240 in step 12.

Besides the RRC Connection Release or Release with Suspend indication (see messages 215 in FIG. 2) by the network based on the data inactivity timers described with reference to FIG. 3, the following indicators (sent by the UE to the network) are also used:

1) Signaling Connection Release Indicator (SCRI) in UTRAN,
2) Power Preference Indicator (PPI) in E-UTRAN,
3) Release Assistance Indicator (RAI) via MAC in NB-IoT,
4) Release Assistance Indicator (RAI) via NAS in CIoT,
5) UE request for release to IDLE or INACTIVE state,
6) UE preferred SCell/BWP/DRX configurations, and/or
7) Mobility history information.

Furthermore, the inactivity and timer-based autonomous UE release from CONNECTED to IDLE/INACTIVE states has also been proposed.

Figure 4:
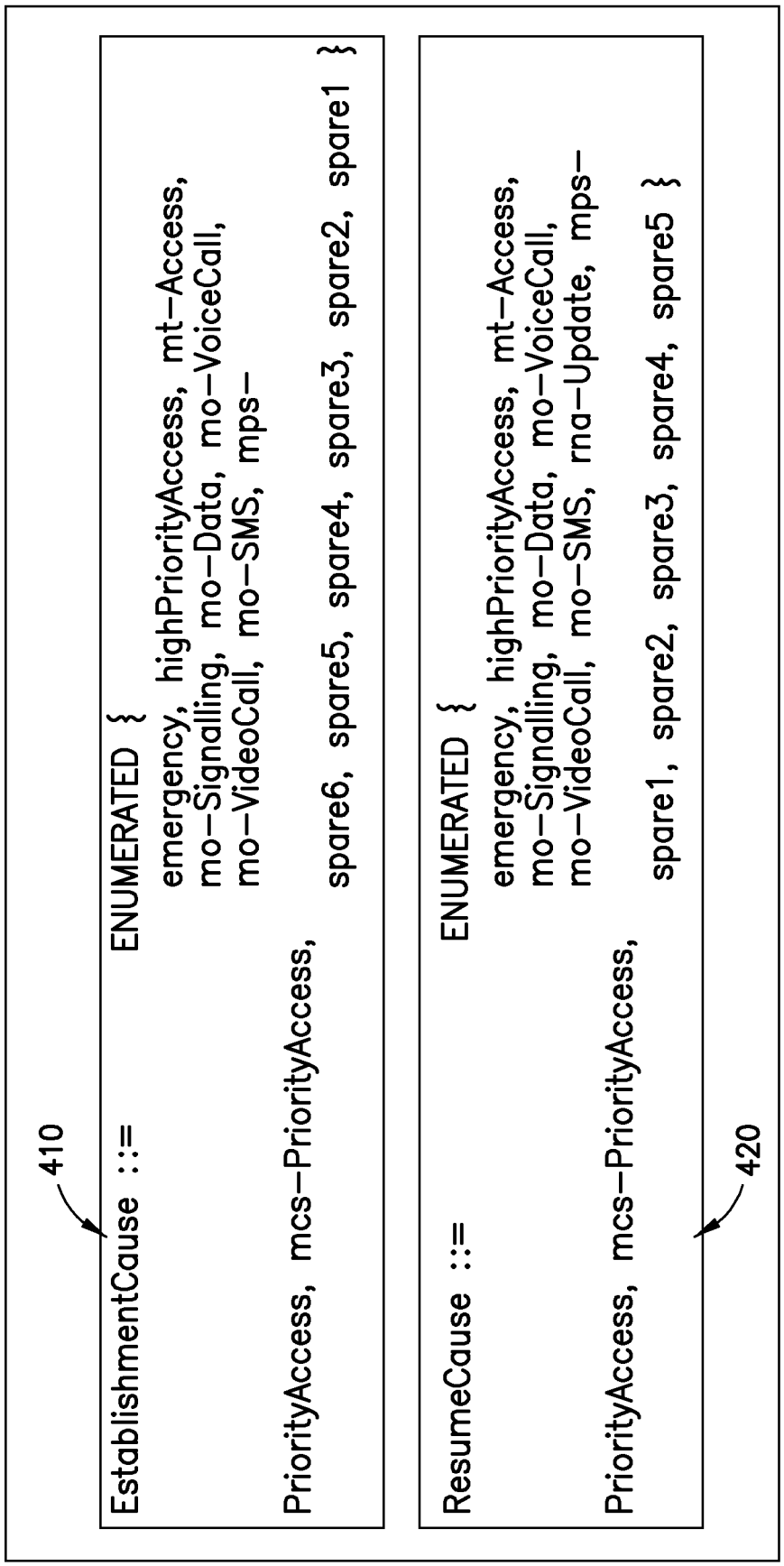
FIG. 4 illustrates information including cause values defined for the RRC establishment/resume request messages, which is from 3GPP TS 38.331.

In Rel-15 NR, at the connection establishment/resume phase, the UE can provide to the network only information about the cause for the connection request to be set based on information, e.g., received from upper layers such as TCP/IP or FTP protocols. As is known, there are multiple layers in a wireless communication protocol stack, and these have upper and lower layers. The cause values are, however, not informative of the characteristics of the required data transmission. Specifically, the current cause values defined for the RRC establishment/resume request messages comprise information illustrated in FIG. 4, which is from 3GPP TS 38.331. See 3GPP TS 38.331 V15.7.0 (2019-09), "Radio Resource Control (RRC) protocol specification". Reference 410 shows an EstablishmentCause information element (IE) with a number of enumerated (ENUMERATED) values (see the RRCSetupRequest message in TS 38.331), while reference 420 shows a ResumeCause IE with additional enumerated (ENUMERATED) values (see the ResumeCause information element in TS 38.331).

Figure 5B:
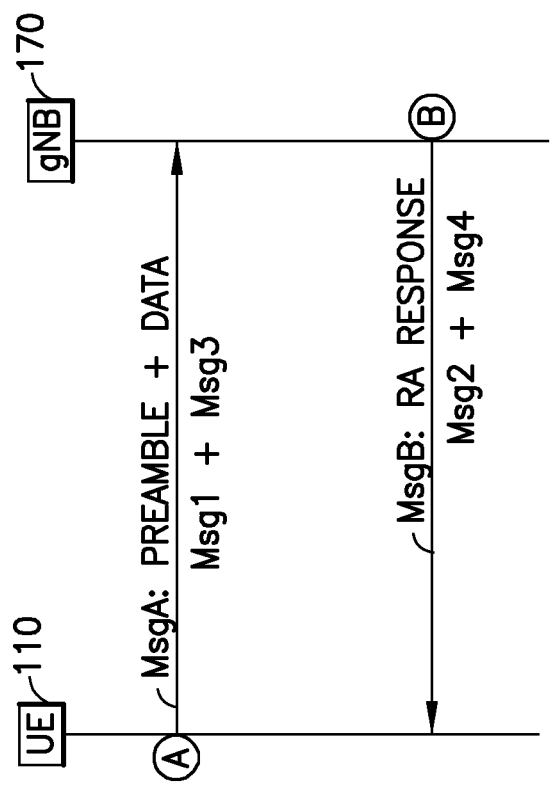
FIG. 5B is a signaling diagram for a 2-step RACH procedure.
Figure 5A:
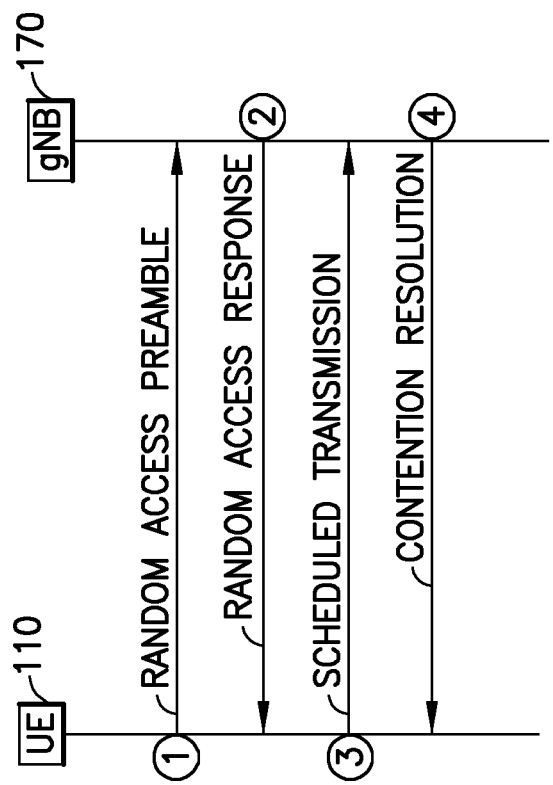
FIG. 5A is a signaling diagram for a 4-step RACH procedure.

It is noted also that 3GPP has on ongoing work item on a 2-step RACH procedure for NR in RP-182894. See RP-182894, ZTE Corporation, Sanechips, "New work item: 2-step RACH for NR", 3GPP TSG RAN Meeting #82, Sorrento, Italy, Dec. 10-13, 2018. The 4-step RACH procedure (see FIG. 5A) is supported in Rel-15 NR. In the 4-step procedure of FIG. 5A, the UE 110 sends a random access preamble in step 1 (Msg1), and the gNB 170 responds with a random access response in step 2 (Msg2). In step 3 (Msg3), the UE 110 sends a scheduled transmission, to which the gNB 170 responds with contention resolution signaling in step 4 (Msg4).

The 2-step RACH procedure is an effort to shorten this. In the 2-step RACH procedure (see FIG. 5B), MsgA combines the preamble signal transmitted on PRACH (Msg1) and the data signal transmitted on PUSCH (Msg3), while MsgB combines the random-access response (Msg2) and the contention resolution (Msg4) of the legacy 4-step RACH procedure.

Now that an introduction to the technical area has been provided, an overview of the exemplary embodiments is provided. The exemplary embodiments propose network configuration of UE assistance, which is beneficial to optimize the network decision of RRC state transition and to enable differentiating decisions on a per-UE basis and accounting for the current UE needs. As one illustrative difference, the above indicators (1)-(7) are always provided by UEs in the RRC CONNECTED state, differently from the exemplary embodiments, where the network configures the UE to provision UE assistance already at connection establishment/resume phase.

Additionally, exemplary embodiments herein introduce network configuration of UE assistance information for efficient RRC state change, where a UE should provide the same as an early indication at the connection establishment phase or connection resume phase. Such UE assistance, denoted primarily by "early (e.g., RRC) state handling assistance" herein, indicates information about the needed RRC connection that the UE is requesting with the aim to assist the network in determining the benefit of an upcoming RRC state transition for the UE.

In broad and non-limiting terms, an exemplary embodiment is as follows:

A) First, the network configures the UE to report at connection setup/resume an "early state handling assistance information". This network configuration may comprise whether a UE should report such assistance information for a given session/application and which information the UE should include when reporting this information (e.g. "Data amount", "Session length", and/or "DRB preference" information, described below).

B) Then, in response to data appearing in the buffer of the UE, while the UE is in an RRC Idle/Inactive state, for one or more applications, the UE will initiate a connection establishment/resume procedure as currently performed. As per exemplary embodiments herein, though, the UE determines whether the UE can determine and populate the "early state handling assistance information" fields to report the information, e.g., based on the applications running at the time the establishment or resume is requested and/or according to the network configuration (e.g., whether reporting is configured, the application had a long or short session, and the like). If the determination is positive, the UE will report "early state handling assistance information" to the network during the establishment/resume, e.g., via MSG1/MsgA or MSG3 or MSG5.

C) If received, the network will use the "early state handling assistance information" to determine the RRC state handling of the UE, e.g., whether to immediately release its connection or keep the UE in RRC Connected state after a connection setup/resume.

The network configuration, which is configured in operation (A) and used in the other operations, indicates which information the UE 110 should include as part of the UE assistance information. This network information may be configured by the gNB to the UE (e.g., see step 2 of FIG. 6, described below) to be reported by the UE, and also reported by the UE to the gNB (e.g., see step 3 of FIG. 6, described below). The information comprises characteristics of the needed data transmission according to one or more of the following non-limiting examples:

a) Data amount: this field indicates the amount of data expected to be delivered during the requested connection and could have following values as non-limiting examples:
    (i) "No data expected", "not that much data expected", "no DL and/or UL data expected"; or
    ii) "less than X bits expected", "a single data packet expected"; or
    iii) any combinations thereof.
  b) Session length: this field indicates the length of the session to be accommodated during the requested connection and could have following values as examples: "short", "long", or "X seconds" (where X is the expected session length in seconds);
  c) DRB preference: indicating whether the UE prefers/ needs a DRB for this data transmission.
  d) State preference: this field indicates the RRC state (IDLE/INACTIVE/CONNECTED) the UE prefers after the data is transmitted.
  e) State transition condition: this field indicates the UE preferred RRC state after for example:
  i) A certain amount of UL and/or DL is transmitted, and/or
  ii) A connection has lasted a certain amount of time.

In one embodiment, the network configuration may also indicate whether a UE should provide "early state handling assistance" based, e.g., on UE/subscriber type and/or traffic type. For example, the network configuration may be on a per-UE basis, so that some UEs may be configured with the reporting of such "early state handling assistance" and others not. If configured and if the information is available, the UE will have to report the "early state handling assistance". Regarding traffic types, services within an enhanced MBB category could be used comprising, for example, web browsing, video/audio streaming, and/or file download. The network configuration may instruct the UE to report the proposed assistance information depending on the application/service that is currently running at the UE. Assistance information can be provided by the UE using, e.g., MSG1/MsgA or MSG3 or MSG5.

In one embodiment, random access resources are reserved based on the UE's preferred RRC state. The network (e.g., gNB 170) can determine which RRC state is preferred by the UE 110 based on the used random access resources (e.g., PRACH preamble, associated PUSCH). There can be, e.g., three different random access resource states e.g., IDLE, INACTIVE and CONNECTED states. Selection and usage of a resources state can be for instance based on the expected UL/DL data amount, session length, and the like.

In one embodiment, a new RRC message is defined for this purpose, which can be conveyed via, e.g., CCCH after the MSG3 has been transmitted/submitted to a lower layer for transmission. This enables the UE 110 to send such RRC message over dedicated resources that are not subject to RA MSG3 size limitations. In one option, the UE can indicate in MSG3 that such assistance message is triggered and should be scheduled after the RA procedure completion. Alternatively, new BSR trigger/reporting can be defined where CCCH data can be reported using or along with a BSR before MSG4 has been received; such CCCH data could use, e.g., LCG0. Note that SRBs, over which RRC messages are sent on, are typically assigned to LCG0.

Based on receiving such "early state handling assistance", the network (e.g., a serving cell, as one cell formed by a gNB 170 and assigned to serve the UE) can determine a better (e.g., most optimal) decision in respect to the RRC connection of the UE. Specifically, the gNB could release the UE to the INACTIVE or IDLE state immediately after the data transmission occurs or could keep the RRC connection active for a longer time, as long as needed for accommodating the current data.

Figure 6:
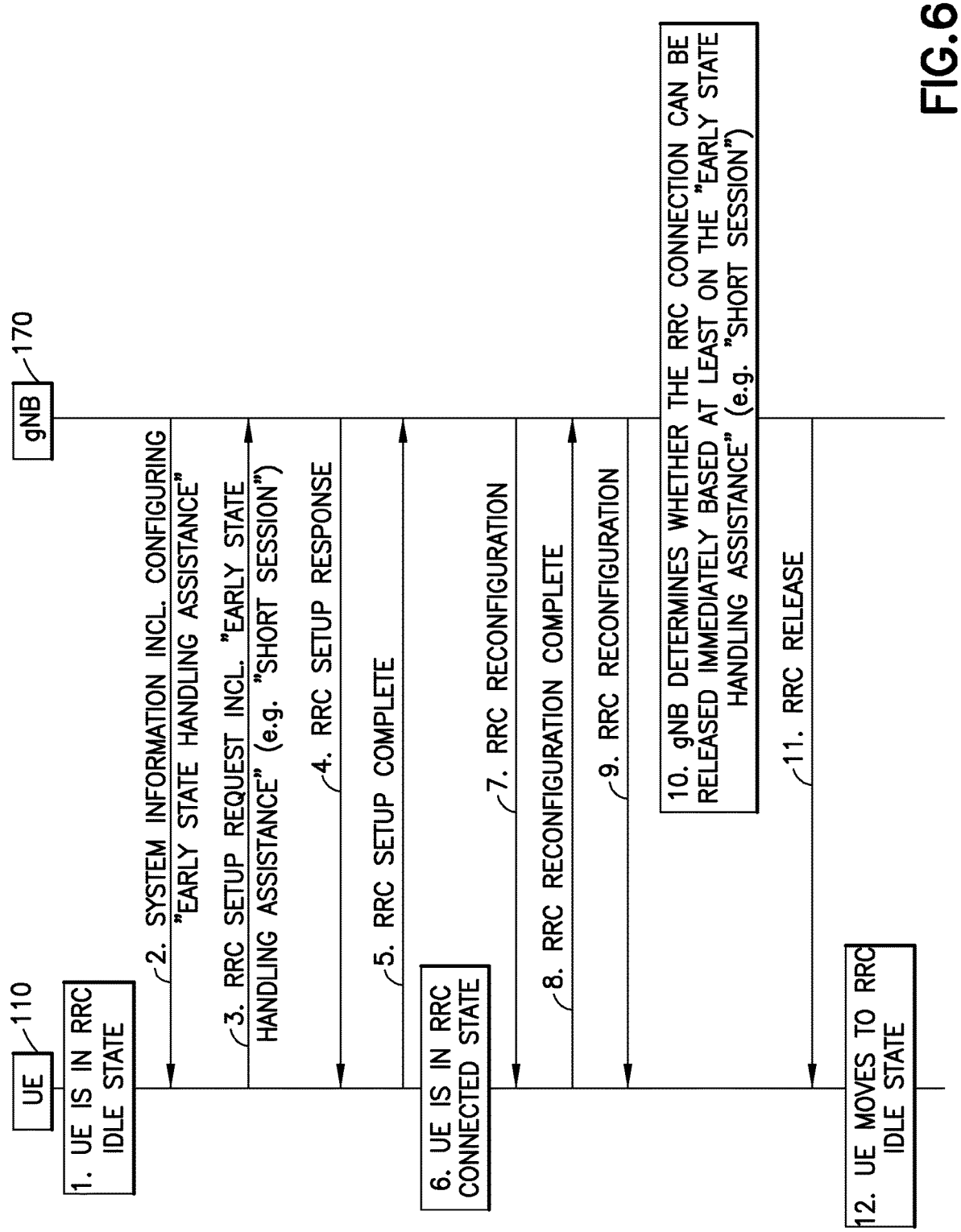
FIG. 6 is a signaling diagram and procedures for an exemplary embodiment.

A schematic flow chart of an exemplary embodiment is shown in FIG. 6, which illustrates a signaling diagram and procedures for an exemplary embodiment. Exemplary steps are indicated by an increasing numbering. The steps also illustrates the operation of an exemplary method or methods, a result of execution of computer program instructions embodied on a computer readable memory, functions performed by logic implemented in hardware, and/or interconnected means for performing functions in accordance with exemplary embodiments. The UE 110 would perform these operations under control of the control module 140, and the gNB would perform these operations under control of its control module 150.

In this example, the UE 110 is assumed to be in the RRC IDLE state. However, similar procedures can be applied for UEs 110 in the RRC INACTIVE state, where the "early state handling assistance" can be provided as part of the RRC resume message. The UE assistance information "early state handling assistance" could be provided, if available, as part of MSG⅓/MsgA according to network configuration. As an alternative, the UE assistance information could be provided by expanding the establishment/resume cause values or by adding an additional field or fields. Whenever possible, the UE can determine and populate the "early state handling assistance" fields, e.g., based on the applications running at the time the establishment or resume is requested and according to the network configuration, which determines whether the UE should include any combinations of the potential fields. The potential fields could include, for example "Data amount", "Session length", and "DRB preference" information.

In FIG. 6, the UE 110 is assumed to be in the RRC IDLE state in step 1. In step 2, the gNB 170 sends system information, including configuring of "early state handling assistance", in signaling. The UE 110 responds, in step 3, with an RRC Setup Request message, including "early state handling assistance" such as "short session" for a "Session length" field. In step 4, the gNB 170 responds with an RRC Setup Response message in signaling, and the UE 110 responds with an RRC Setup Complete message in its signaling in step 5. At this point, the UE 110 is connected to the network and is in the RRC CONNECTED state (see step 6).

In step 7, the gNB 170 sends an RRC Reconfiguration message via signaling. The UE 110 in step 8 responds with signaling including the RRC Reconfiguration Complete message. The gNB 170 responds with an RRC Reconfiguration message in its signaling. See step 9.

In step 10, the gNB 170 determines whether the RRC connection can be released immediately, based at least on the "early state handling assistance" (e.g., "short session"). In this example, it is assumed the gNB 170 has decided to release the RRC connection, and therefore, in step 11, the gNB 170 sends an RRC Release message to the UE 110. The UE consequently moves to the RRC IDLE state in step 12.

Figure 7:
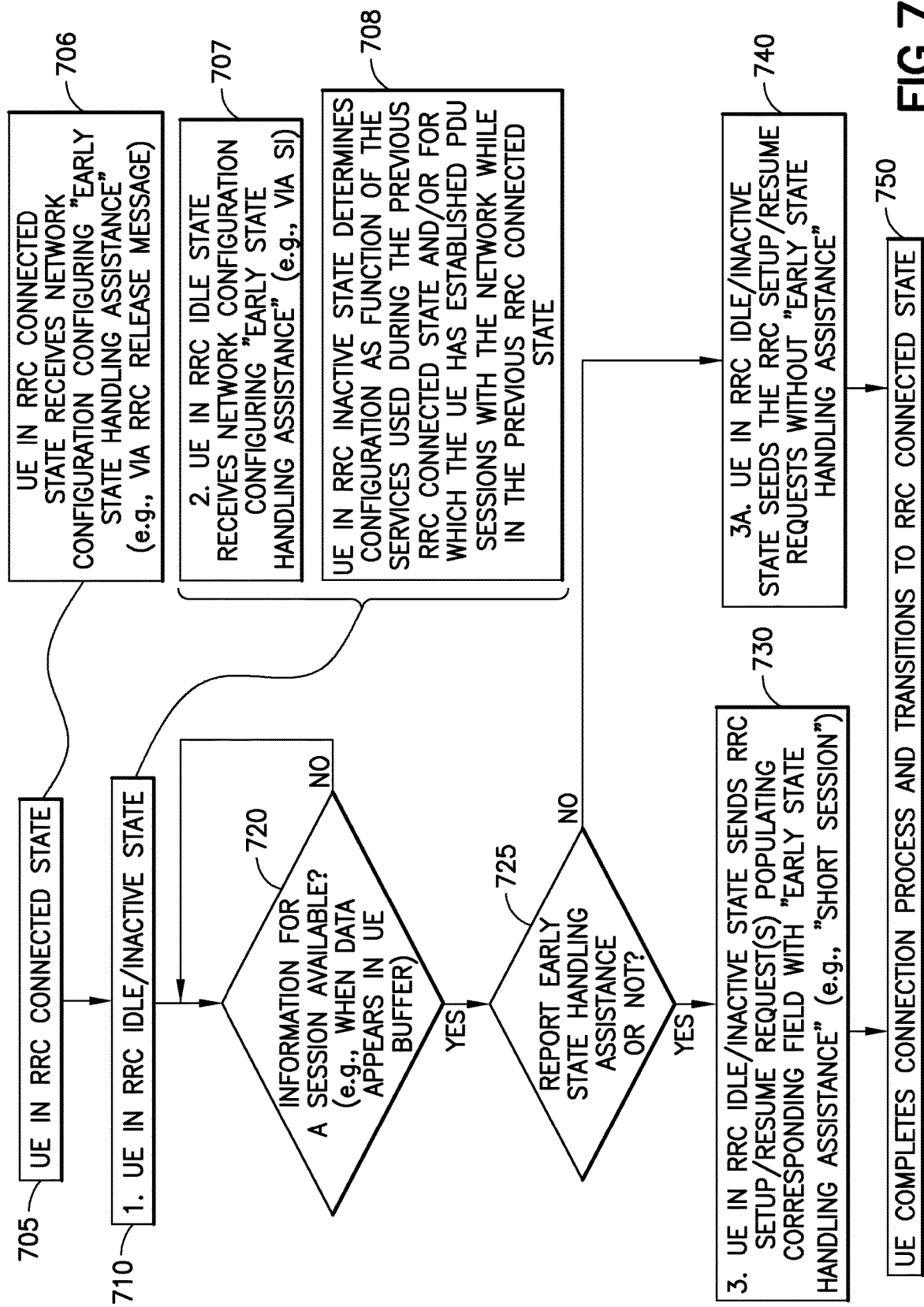
FIG. 7 is a logic flow diagram covering certain exemplary embodiments from the UE perspective (e.g., steps 1-3 from FIG. 6), and illustrates the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 7, this figure is a logic flow diagram covering certain exemplary embodiments from the UE perspective (e.g., steps 1-3 from FIG. 6). There are a number of possibilities to address making the configuration for the "early state handling assistance" to be UE-specific. For instance, in block 705, a UE 110 could be in an RRC CONNECTED state. As illustrated by block 706, the UE 110 in the RRC CONNECTED state receives network configuration configuring "early state handling assistance" (e.g., via an RRC Release message). Based on the received RRC Release message, the UE transitions to the RRC IDLE (or INACTIVE) state, as illustrated in block 710. This is one technique to configure "early state handling assistance". The RRC IDLE (or INACTIVE) state corresponds to step 1 in FIG. 6.

Other examples are illustrated in block 707 and 708, which occur when the UE 110 is in the RRC IDLE/INACTIVE state. In block 707, the UE 110 receives network configuration configuring "early state handling assistance". Such information might be sent via System Information (SI), as an example. This corresponds to step 2 in FIG. 6. Block 708 illustrates that the UE in the RRC INACTIVE state determines the configuration as a function of the services used during the previous RRC CONNECTED state and/or for which the UE has established PDU sessions with the network while in the previous RRC CONNECTED state. The previous RRC CONNECTED state may be considered to be block 705.

Thus, there are multiple techniques for the network, e.g., via the gNB 170, to configure the UE 110 with "early state handling assistance". This configuration can be per-UE, meaning that some UE(s) will be configured with this, and other UE(s) will not be configured as such.

In block 720, the UE 110 determines whether information for a session is available. That is, the information being in the buffer should cause the UE to start a connection process to change the RRC state. Based on the configuration from block 710 and session information being available in the buffer, the UE can then determine whether to send the "early state handling assistance" information or not.

If there is no information in the buffer (block 720=No), then the UE waits. If there is information in the buffer (block 720=Yes), the UE 110 in block 725 determines whether to request early state handling assistance or not.

There are a number of ways to view the process until this point. One is to consider a generic 3GPP paradigm. At a high level, this paradigm is the following:
1—the network configures the UE to report UE assistance information about X (e.g. whether to report, when to report, what to report);
2—the UE assists the network by providing UE assistance information about X (if the UE can determine the information); and
3—the network decides on X accounting for the received UE assistance.

For the exemplary embodiments herein, this paradigm may be considered as follows: X=RRC state change; and UE assistance information="early state handling assistance information" (i.e. early assistance information for RRC state handling).

On one level, therefore, the UE can simply base a determination as to whether or not to report the "early state handling assistance" in block 725 by whether the UE is configured to do this (e.g., and whether such "early state handling assistance" information is available).

It is, however, possible for a UE to also consider additional information in block 725. For instance, the UE may decide not to report early state handling assistance, for example, in case a long session is expected, such as via video, audio, or other applications that are assumed to last a long time. Meanwhile, texts, emails, or checking the weather may not last a long time. In more detail, since many UE implementations can be foreseen to convey information from upper layers to populate the UE assistance information, it may be up to UE implementation as to when the UE will report early state handling assistance. This may depend on the control/awareness that the application client (in the UE) may have about the requested session length or, more simply, this may depend on the typical session lengths for a given application. For instance, the UE could report the assistance when Netflix (an Internet entertainment service) is running, as typical Netflix sessions are long (in order of tens of minutes or more), or if a YouTube (a video-sharing website) client is running (short videos can be assumed, still in the order of few minutes per video). No reporting instead is to be made when requesting voice services as the length can drastically vary. Similarly, reporting for web-browsing may depend on the actual web pages which are visited.

As an initial implementation, the paradigm described above is used. It is nonetheless possible for the UE to build upon that paradigm using information such as the length of the session and other considerations, as described herein.

If the UE 110 determines not to request early state handling, (block 725=No), in block 740, the UE in RRC IDLE/INACTIVE state seeds the RRC setup/resume requests without any "early state handling assistance" indicator. That is, the UE would send RRC Setup Request message(s) (or RRC Resume Request message(s)) without the "early state handling assistance" information. See step 2 of FIG. 3, or step 3 of FIG. 6, except that the "early state handling assistance" information would not be used in step 3 of FIG. 6. This could be considered to be step 3A, using the numbering of FIG. 6.

If the UE does decide to request early state handling assistance (block 725=Yes), the UE 110, which is in RRC IDLE/INACTIVE state, sends RRC setup/resume request(s) populating corresponding field with "early state handling assistance" (e.g., "short session"). See block 730. This corresponds to step 3 in FIG. 6.

In block 750, the UE completes the connection process and transitions to the RRC CONNECTED state. This corresponds to steps 4, 5, and 6 in FIG. 6.

It can be seen, then, that the UE 110 has the ability to request or not request early state handling assistance. The gNB 170 can similarly address early state handling assistance based on the information provided by the UE.

Figure 8:
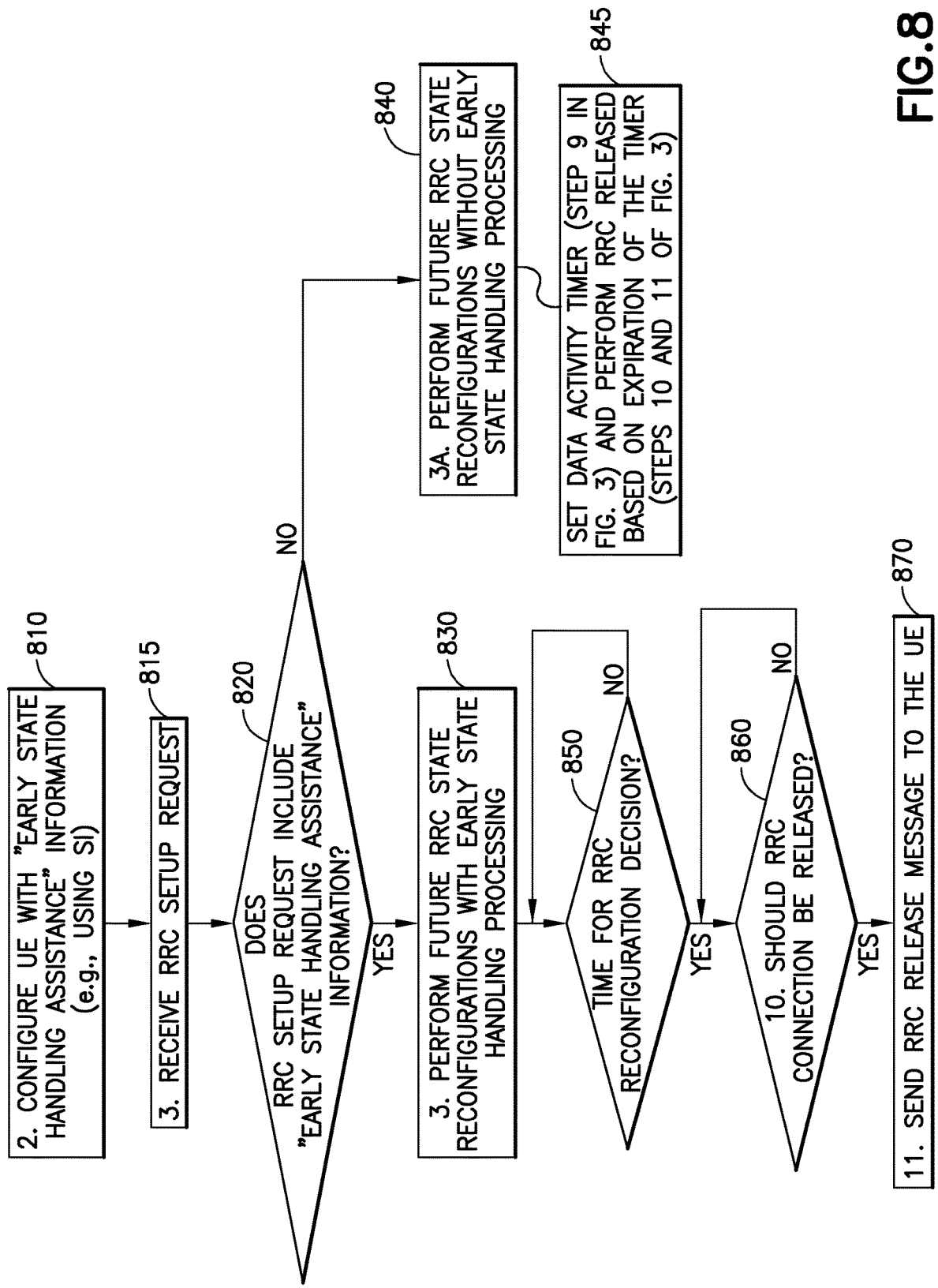
FIG. 8 is a logic flow diagram covering certain exemplary embodiments from the gNB perspective, and illustrates the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 8, this figure is a logic flow diagram covering certain exemplary embodiments from the gNB perspective. This figure illustrates the operation of an exemplary method or methods, a result of execution of computer program instructions embodied on a computer readable memory, functions performed by logic implemented in hardware, and/or interconnected means for performing functions in accordance with exemplary embodiments. The operations in FIG. 8 are performed by the gNB 170, e.g., under control of the control module 150.

In block 810, the gNB 170 configures the UE 110 with "early state handling assistance" information. The configuration may use system information (SI). This corresponds to step 2 in FIG. 6. In block 815, the gNB 170 receives an RRC Setup Request message, and the gNB 170 determines whether the RRC Setup Request message includes the "early state handling assistance" information. If not (step 820=No), the gNB 170 in block 840 performs future (i.e., subsequent) RRC state reconfigurations without early state handling assistance information processing. This corresponds to step 3A in FIG. 7. As previously described, there can be cases when the UE may not provide the information, such as if the UE determines the current session is not applicable to early release. This means (see block 845), the gNB 170 may set a data activity timer (step 9 in FIG. 3) and perform RRC Release based on expiration of the timer (steps 10 and 11 of FIG. 3).

By contrast, if the RRC Setup Request message includes the "early state handling assistance" information (block 820=Yes), the flow proceeds to block 830, where the gNB 170 performs future RRC state reconfigurations with early state handling processing. This also corresponds to step 3 of FIGS. 6 and 7. One illustration of early state handling processing is, e.g., whether the gNB 170 decides to immediately release the RRC connection after a connection setup/resume (and therefore cause the UE to transition from RRC CONNECTED to either RRC IDLE or RRC INACTIVE). This is the early state handling processing. By contrast, the gNB 170 acts without early state handling process if the gNB keeps the UE in the RRC CONNECTED state after a connection setup/resume. It is noted that this early state handling processing is performed without being based on an inactivity timer set by the network. That is, the early state handling processing is made without reference to the inactivity timer, and should be completed before any inactivity timer expires. Furthermore, when the gNB acts without early state handling process, the gNB then uses the inactivity timer, as illustrated in FIG. 3.

In block 850, the gNB 170 determines whether it is time for an RRC Reconfiguration decision. If not (block 850=No), the gNB 170 waits. If it is time (block 850=Yes), in block 860, the gNB 170 determines whether the RRC connection should be released, based at least on the "early state handling assistance", such as using information of "short session" for a "Session length" field. This corresponds to step 10 of FIG. 6.

If the gNB 170 determines the RRC connection should be released immediately, the gNB 170 sends an RRC Release message to the UE in block 870. This corresponds to step 11 of FIG. 6. The gNB should release the connection when all the data is transmitted. If the gNB 170 determines the connection should not be released immediately (block 860=No), such as if all the data for the current session has not been transmitted, the flow continues to block 860.

Without in any way limiting the scope, interpretation, or application of the claims appearing below, a technical effect of one or more of the example embodiments disclosed herein is achieving a more effective RRC state management based on an early indication from the UE, where such assistance information is provided already in the connection establishment phase instead of during the RRC CONNECTED state. In turn, this results in further UE power saving.

The following are additional examples.

Example 1. A method, comprising:
  receiving, by a user equipment in a wireless network, a configuration of early state handling assistance information from the network;
  determining, by the user equipment and using at least the configuration, whether early state handling assistance should be reported to the network in a request for a connection to the network;
  requesting by the user equipment the connection to the network; and
  responsive to the determination, performing one of the following in the requesting:
  reporting by the user equipment the early state handling assistance from the network using one or more radio resource control messages; or
  not reporting by the user equipment the early state handling assistance from the network, at least by the user equipment using one or more radio resource control messages without an indication of early state handling assistance.

Example 2. The method of example 1, wherein the requesting is performed in a process to transition the user equipment from a first radio resource control state to the radio resource control connected state.

Example 3. The method of any of examples 1 to 2, wherein:
  the reporting by the user equipment the early state handling assistance from the network using one or more radio resource control messages is performed;
  the method further comprises:
  entering by the user equipment into a radio resource control connected state indicating a connection has been made to the network; and
  moving, by the user equipment, from the radio resource control connected state to a state other than the radio resource control connected state, in response to receiving from the network a radio resource control release message for the current session.

Example 4. The method of example 3, further comprising, prior to the reporting the early state handling assistance, determining, by the user equipment, the user equipment will report early state handling assistance from the network, and performing the reporting based on the determination.

Example 5. The method of example 4, wherein the determining the user equipment will report early state handling assistance from the network is based at least on a traffic type of data to be transmitted by the user equipment after connection to the network.

Example 6. The method of any of examples 3 to 5, wherein the reporting by the user equipment the early state handling assistance from the network further comprises reporting by the user equipment the early state handling assistance from the network using one or more radio resource control setup or resume request messages.

Example 7. The method of any of examples 3 to 6, wherein the reporting of early state handling assistance comprises one or more of the following:
- a data amount field indicating an amount of data expected to be delivered during a current session and comprising one or more of the following: (i) "No data expected", "not that much data expected", "no DL and/or UL data expected"; or ii) "less than X bits expected", "a single data packet expected"; or iii) any combinations thereof;
- a session length field indicating a length of the current session to be accommodated during a requested connection and comprise one or more of the following values: "short", "long", or "X seconds", where X is the length in seconds;
- a data radio bearer preference field indicating whether the user equipment prefers or needs a data radio bearer for a data transmission to be performed in the current session;
- a state preference field indicating a radio resource control state the user equipment prefers after data is transmitted in the current session; or
- a state transition condition field indicating a user equipment-preferred radio resource control state after i) a certain amount of uplink and/or downlink data is transmitted, and/or ii) a connection used in the current session has lasted a certain amount of time.

Example 8. The method of any of examples 1 to 2, wherein:
- the not reporting the early state handling assistance is performed;
- the method further comprises:
  - entering by the user equipment into a radio resource control connected state indicating a connection has been made to the network; and
  - moving, by the user equipment, to a state other than the radio resource control connected state, in response to receiving from the network a radio resource control release message for the current session, wherein the radio resource control release message for the current session has been sent due to expiration of a timer on the network.

Example 9. The method of any of examples 1 to 2 or 8, wherein the not reporting by the user equipment the early state handling assistance from the network further comprises not reporting by the user equipment the early state handling assistance from the network by sending one or more radio resource control setup or resume request messages without the indication of early state handling assistance.

Example 10. The method of any of examples 1 to 9, wherein the first radio resource control state is one of an inactive or idle state.

Example 11. A method, comprising:
- transmitting, by a base station in a wireless network and toward a user equipment in the network, a configuration of early state handling assistance information;
- receiving one or more radio resource control messages from the user equipment in a request for a connection to the network;
- determining whether the received one or more radio resource control messages comprise reporting of early state handling assistance; and
- responsive to the determination, performing one of the following:
  - for the one or more radio resource control messages comprising the reporting of early state handling assistance, performing radio resource control reconfigurations with early state handling processing; or
  - for the one or more radio resource control messages without the reporting of early state handling assistance, performing radio resource control reconfigurations without the early state handling processing.

Example 12. The method of example 11, wherein the request is performed in a process to transition the user equipment from a first radio resource control state to the radio resource control connected state.

Example 13. The method of any of examples 11 or 12, wherein:
- the one or more radio resource control messages comprise the indication of early state handling assistance and the performing radio resource control reconfigurations with early state handling processing is performed;
- the method further comprises sending by the base station one or more messages to cause the user equipment to enter into the radio resource control connected state; and
- the performing radio resource control reconfigurations with early state handling processing further comprises:
  - determining by the base station a radio resource control connection for the user equipment can be released based at least on the reporting of early state handling assistance in the one or more radio resource control messages; and
  - sending, responsive to the determining the radio resource control connection for the user equipment can be released, a radio resource control release message to the user equipment to cause the user equipment to release the radio resource control connection.

Example 14. The method of example 13, wherein the receiving one or more radio resource control messages from the user equipment further comprises receiving the one or more radio resource control messages from the user equipment using one or more radio resource control setup or resume request messages.

Example 15. The method of any of examples 13 to 14, wherein:
- the reporting of early state handling assistance comprises one or more of the following:
- a data amount field indicating an amount of data expected to be delivered during a current session and comprising one or more of the following: (i) "No data expected", "not that much data expected", "no DL and/or UL data expected"; or ii) "less than X bits expected", "a single data packet expected"; or iii) any combinations thereof;
- a session length field indicating a length of the current session to be accommodated during a requested connection and comprise one or more of the following values: "short", "long", or "X seconds", where X is the length in seconds;
- a data radio bearer preference field indicating whether the user equipment prefers or needs a data radio bearer for a data transmission to be performed in the current session;
- a state preference field indicating a radio resource control state the user equipment prefers after data is transmitted in the current session; or
- a state transition condition field indicating a user equipment-preferred radio resource control state after i) a certain amount of uplink and/or downlink data is transmitted, and/or ii) a connection used in the current session has lasted a certain amount of time; and the determining by the base station the radio resource control connection for the user equipment can be released uses one or more of the fields in the indication of early state handling assistance in the one or more radio resource control messages to determine to release the radio resource control connection for the user equipment.

Example 16. The method of any of examples 11 or 12, wherein:

the one or more radio resource control messages are received without the indication of early state handling assistance and the performing radio resource control reconfigurations without the early state handling processing is performed;

the method further comprises sending by the base station one or more messages to cause the user equipment to enter into the radio resource control connected state; and the performing radio resource control reconfigurations without the early state handling processing comprises:

setting, by the base station and in response to no activity being received from the user equipment, a timer;

sending, in response to the timer expiring without activity being received from the user equipment, a radio resource control release message from the base station to the user equipment.

Example 17. The method of any of examples 11 to 16, wherein the first radio resource control state is one of an inactive or idle state.

Example 18. A computer program, comprising code for performing the methods of any of examples 1 to 17, when the computer program is run on a computer.

Example 19. The computer program according to example 18, wherein the computer program is a computer program product comprising a computer-readable medium bearing computer program code embodied therein for use with the computer.

Example 20. The computer program according to example 18, wherein the computer program is directly loadable into an internal memory of the computer.

Example 21. An apparatus, comprising:

means for receiving, by a user equipment in a wireless network, a configuration of early state handling assistance information from the network;

means for determining, by the user equipment and using at least the configuration, whether early state handling assistance should be reported to the network in a request for a connection to the network;

means for requesting by the user equipment the connection to the network; and means, responsive to the determination, for performing one of the following in the requesting:

reporting by the user equipment the early state handling assistance from the network using one or more radio resource control messages; or not reporting by the user equipment the early state handling assistance from the network, at least by the user equipment using one or more radio resource control messages without an indication of early state handling assistance.

Example 22. The apparatus of example 21, wherein the requesting is performed in a process to transition the user equipment from a first radio resource control state to the radio resource control connected state.

Example 23. The apparatus of any of examples 21 to 22, wherein:

the reporting by the user equipment the early state handling assistance from the network using one or more radio resource control messages is performed;

the apparatus further comprises:

means for entering by the user equipment into a radio resource control connected state indicating a connection has been made to the network; and means for moving, by the user equipment, from the radio resource control connected state to a state other than the radio resource control connected state, in response to receiving from the network a radio resource control release message for the current session.

Example 24. The apparatus of example 23, further comprising means, performed prior to the reporting the early state handling assistance, for determining, by the user equipment, the user equipment will report early state handling assistance from the network, and means for performing the reporting based on the determination.

Example 25. The apparatus of example 24, wherein the determining the user equipment will report early state handling assistance from the network is based at least on a traffic type of data to be transmitted by the user equipment after connection to the network.

Example 26. The apparatus of any of examples 23 to 25, wherein the reporting by the user equipment the early state handling assistance from the network further comprises reporting by the user equipment the early state handling assistance from the network using one or more radio resource control setup or resume request messages.

Example 27. The apparatus of any of examples 23 to 26, wherein the reporting of early state handling assistance comprises one or more of the following:

a data amount field indicating an amount of data expected to be delivered during a current session and comprising one or more of the following: (i) "No data expected", "not that much data expected", "no DL and/or UL data expected"; or ii) "less than X bits expected", "a single data packet expected"; or iii) any combinations thereof;

a session length field indicating a length of the current session to be accommodated during a requested connection and comprise one or more of the following values: "short", "long", or "X seconds", where X is the length in seconds;

a data radio bearer preference field indicating whether the user equipment prefers or needs a data radio bearer for a data transmission to be performed in the current session;

a state preference field indicating a radio resource control state the user equipment prefers after data is transmitted in the current session; or a state transition condition field indicating a user equipment-preferred radio resource control state after i) a certain amount of uplink and/or downlink data is transmitted, and/or ii) a connection used in the current session has lasted a certain amount of time.

Example 28. The apparatus of any of examples 21 to 22, wherein:

the not reporting the early state handling assistance is performed;

the apparatus further comprises:

means for entering by the user equipment into a radio resource control connected state indicating a connection has been made to the network; and means for moving, by the user equipment, to a state other than the radio resource control connected state, in response to receiving from the network a radio resource control release message for the current session, wherein the radio resource control release message for the current session has been sent due to expiration of a timer on the network.

Example 29. The apparatus of any of examples 21 to 22 or 28, wherein the not reporting by the user equipment the early state handling assistance from the network further comprises not reporting by the user equipment the early state handling assistance from the network by sending one or more radio resource control setup or resume request messages without the indication of early state handling assistance.

Example 30. The apparatus of any of examples 21 to 29, wherein the first radio resource control state is one of an inactive or idle state.

Example 31. An apparatus, comprising:
means for transmitting, by a base station in a wireless network and toward a user equipment in the network, a configuration of early state handling assistance information;
means for receiving one or more radio resource control messages from the user equipment in a request for a connection to the network;
means for determining whether the received one or more radio resource control messages comprise reporting of early state handling assistance; and
means, responsive to the determination, for performing one of the following:
for the one or more radio resource control messages comprising the reporting of early state handling assistance, performing radio resource control reconfigurations with early state handling processing; or
for the one or more radio resource control messages without the reporting of early state handling assistance, performing radio resource control reconfigurations without the early state handling processing.

Example 32. The apparatus of example 31, wherein the request is performed in a process to transition the user equipment from a first radio resource control state to the radio resource control connected state.

Example 33. The apparatus of any of examples 31 or 32, wherein:
the one or more radio resource control messages comprise the indication of early state handling assistance and the performing radio resource control reconfigurations with early state handling processing is performed;
the apparatus further comprises means for sending by the base station one or more messages to cause the user equipment to enter into the radio resource control connected state; and
the performing radio resource control reconfigurations with early state handling processing further comprises:
means for determining by the base station a radio resource control connection for the user equipment can be released based at least on the reporting of early state handling assistance in the one or more radio resource control messages; and
means for sending, responsive to the determining the radio resource control connection for the user equipment can be released, a radio resource control release message to the user equipment to cause the user equipment to release the radio resource control connection.

Example 34. The apparatus of example 33, wherein the means for receiving one or more radio resource control messages from the user equipment further comprises means for receiving the one or more radio resource control messages from the user equipment using one or more radio resource control setup or resume request messages.

Example 35. The apparatus of any of examples 33 to 34, wherein:
the reporting of early state handling assistance comprises one or more of the following:
a data amount field indicating an amount of data expected to be delivered during a current session and comprising one or more of the following: (i) "No data expected", "not that much data expected", "no DL and/or UL data expected"; or ii) "less than X bits expected", "a single data packet expected"; or iii) any combinations thereof;
a session length field indicating a length of the current session to be accommodated during a requested connection and comprise one or more of the following values: "short", "long", or "X seconds", where X is the length in seconds;
a data radio bearer preference field indicating whether the user equipment prefers or needs a data radio bearer for a data transmission to be performed in the current session;
a state preference field indicating a radio resource control state the user equipment prefers after data is transmitted in the current session; or
a state transition condition field indicating a user equipment-preferred radio resource control state after i) a certain amount of uplink and/or downlink data is transmitted, and/or ii) a connection used in the current session has lasted a certain amount of time; and
the determining by the base station the radio resource control connection for the user equipment can be released uses one or more of the fields in the indication of early state handling assistance in the one or more radio resource control messages to determine to release the radio resource control connection for the user equipment.

Example 36. The apparatus of any of examples 31 or 32, wherein:
the one or more radio resource control messages are received without the indication of early state handling assistance and the performing radio resource control reconfigurations without the early state handling processing is performed;
the apparatus further comprises means for sending by the base station one or more messages to cause the user equipment to enter into the radio resource control connected state; and
the performing radio resource control reconfigurations without the early state handling processing comprises:
means for setting, by the base station and in response to no activity being received from the user equipment, a timer;
means for sending, in response to the timer expiring without activity being received from the user equipment, a radio resource control release message from the base station to the user equipment.

Example 37. The apparatus of any of examples 31 to 36, wherein the first radio resource control state is one of an inactive or idle state.

Example 38. An apparatus, comprising:
one or more processors; and
one or more memories including computer program code, wherein the one or more memories and the computer program code are configured, with the one or more processors, to cause the apparatus to perform operations comprising:

receiving, by a user equipment in a wireless network, a configuration of early state handling assistance information from the network;

determining, by the user equipment and using at least the configuration, whether early state handling assistance should be reported to the network in a request for a connection to the network;

requesting by the user equipment the connection to the network; and responsive to the determination, performing one of the following in the requesting:

reporting by the user equipment the early state handling assistance from the network using one or more radio resource control messages; or not reporting by the user equipment the early state handling assistance from the network, at least by the user equipment using one or more radio resource control messages without an indication of early state handling assistance.

Example 39. The apparatus of example 38, wherein the one or more memories and the computer program code are further configured, with the one or more processors, to cause the apparatus to perform operations in the methods of any of examples 1 to 17.

Example 40. An apparatus, comprising:
one or more processors; and
one or more memories including computer program code, wherein the one or more memories and the computer program code are configured, with the one or more processors, to cause the apparatus to perform operations comprising:

transmitting, by a base station in a wireless network and toward a user equipment in the network, a configuration of early state handling assistance information;

receiving one or more radio resource control messages from the user equipment in a request for a connection to the network;

determining whether the received one or more radio resource control messages comprise reporting of early state handling assistance; and responsive to the determination, performing one of the following:

for the one or more radio resource control messages comprising the reporting of early state handling assistance, performing radio resource control reconfigurations with early state handling processing; or for the one or more radio resource control messages without the reporting of early state handling assistance, performing radio resource control reconfigurations without the early state handling processing.

Example 41. The apparatus of example 40, wherein the one or more memories and the computer program code are further configured, with the one or more processors, to cause the apparatus to perform operations in the methods of any of examples 11 to 17.+

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
receiving, by a user equipment in a network, a configuration of early state handling assistance information from the network, wherein the early state handling assistance information indicates information that could be reported by the user equipment for session volving data transmission and to assist e network in determining when to release a radio resource control (RRC) connection for the session while the user equipment is in an RRC connected state for the session;

determining, by the user equipment and using at least the configuration, that early state handling assistance information should be reported to the network for a given session for a data transmission;

requesting by the user equipment a connection to the network for the given session including the data transmission from the user equipment to the network, wherein the requesting is performed with the user equipment in a first RRC state for power saying, the requesting including reporting the early state handling assistance information;

completing, by the user equipment, the connection to the network and transitioning from the first RRC state to the RRC connected state; and receiving, by the user equipment from the network based on the early state handling assistance information, an RRC release message after the data has been transmitted by the user equipment in the given session.

2. A non-transitory program storage device readable by a machine, tangibly embodying a program of instructions executable by the machine for performing operations, the operations comprising the method as claimed in claim 1.

3. A method, comprising:

transmitting, by a base station in a network and toward a user equipment in the network, a configuration of early state handling assistance information, wherein the early state handling assistance information indicates information that could be reported by the user equipment for a session involving data transmission and to assist the base station in determining when to release a radio resource control (RRC) connection for the session while the user equipment is in an RRC connected state for the session;

receiving one or more radio resource control messages from the user equipment for a data transmission for a given session from the user equipment to the network;

determining the received one or more radio resource control messages comprise reporting of early state handling assistance information;

receiving, by the base station while the user equipment is in an RRC connected state, data from the user equipment for the given session;

determining, by the base station, to release an RRC connection for the session based on the received early state handling assistance information and the data has been received in the given session; and sending, from the base station toward the user equipment, an RRC release message.

4. A non-transitory program storage device readable by a machine, tangibly embodying a program of instructions executable by the machine for performing operations, the operations comprising the method as claimed in claim 3.

5. An apparatus, comprising:

one or more processors; and one or more memories storing instructions that, when executed by the one or more processors, cause the apparatus to perform operations comprising:

receiving, by a user equipment in a network, a configuration of early state handling assistance information from the network, wherein the early state handling assistance information indicates information that could be reported by the user equipment for a session involving data transmission and to assist the network in determining when to release a radio resource control (RRC) connection for the session while the user equipment is in an RRC connected state for the session;

determining, by the user equipment and using at least the configuration, that early state handling assistance information should be reported to the network for a given session for a data transmission;

requesting by the user equipment a connection to the network for the given session including the data transmission from the user equipment to the network, wherein the requesting is performed with the user equipment in a first RRC state for power saving, the requesting including reporting the early state handling assistance information;

completing, by the user equipment, the connection to the network and transitioning from the first RRC state to the RRC connected state; and receiving, by the user equipment from the network based on the early state handling assistance information, an RRC release message after the data has been transmitted by the user equipment in the given session.

6. The apparatus as claimed in claim 5 wherein the one or more memories store instructions that, when executed by the one or more processors, cause the apparatus to perform the requesting in a process to transition the user equipment from the first radio resource control state to the radio resource control connected state.

7. The apparatus as claimed in claim 6 wherein the first radio resource control state is one of an inactive state or idle state.

8. The apparatus as claimed in claim 5 wherein the one or more memories store instructions that, when executed by the one or more processors, cause the apparatus to perform operations comprising: based on the reporting by the user equipment of the early state handling assistance information to the network:

perform entering by the user equipment into the radio resource control connected state indicating a connection has been made to the network; and moving, by the user equipment, from the radio resource control connected state to the first radio resource control connected state for power saving, in response to receiving from the network the radio resource control release message for the given session.

9. The apparatus as claimed in claim 8 wherein the one or more memories store instructions that, when executed by the one or more processors, cause the apparatus to perform operations comprising:

prior to the reporting the early state handling assistance information, determining, by the user equipment, that the user equipment will report early state handling assistance information to the network, and performing the reporting based on the determination.

10. The apparatus as claimed in claim 9 wherein the determining the user equipment will report early state handling assistance information to the network is based at least on a traffic type of data to be transmitted by the user equipment after connection to the network.

11. The apparatus as claimed in claim 5 wherein the reporting, by the user equipment the early state handling assistance information to the network, further comprises reporting by the user equipment the early state handling assistance information to the network using one or more radio resource control setup or resume request messages.

12. The apparatus as claimed in claim 5 wherein the reporting of early state handling assistance information comprises one or more of the following:

a data amount field indicating an amount of data expected to be delivered during a current session and comprising one or more of the following: (i) "No data expected", "not that much data expected", "no DL and/or UL data expected"; or ii) "less than X bits expected", "a single data packet expected"; or iii) any combinations thereof;

a session length field indicating a length of the current session to be accommodated during a requested connection and comprise one or more of the following values: "short", "long", or "X seconds", where X is the length in seconds;
a data radio bearer preference field indicating whether the user equipment prefers or needs a data radio bearer for a data transmission to be performed in the current session;
a state preference field indicating a user equipment-preferred radio resource control state the user equipment prefers after data is transmitted in the current session; or
a state transition condition field indicating a user equipment-preferred radio resource control state after i) a certain amount of uplink and/or downlink data is transmitted, and/or ii) a connection used in the current session has lasted a certain amount of time.

13. An apparatus, comprising:
one or more processors; and
one or more memories storing instructions that, when executed by the one or more processors, cause the apparatus to perform operations comprising:
transmitting, by a base station in a network and toward a user equipment in the network, a configuration of early state handling assistance information, wherein the early state handling assistance information indicates information that could be reported by the user equipment for a session involving data transmission and to assist the network in determining when to release a radio resource control (RRC) connection for the session while the user equipment is in an RRC connected state for the session
receiving one or more radio resource control messages from the user equipment in a request for data transmission for a given session from the user equipment to the network, wherein the base station comprises the apparatus;
determining the received one or more radio resource control messages comprise reporting of early state handling assistance information;
receiving, by the base stat while the user equipment is in an RRC connected state, data from the user equipment for the given session;
determining, by the base station, to release an RRC connection for the session based on the received early state handling assistance information and the data has been received in the given session; and
sending, from the base station toward the user equipment, an RRC release message.

14. The apparatus as claimed in claim 13 wherein the request is performed in a process to transition the user equipment from the first radio resource control state to the radio resource control connected state.

15. The apparatus as claimed in claim 13 wherein the one or more memories store instructions that, when executed by the one or more processors, cause the apparatus to perform operations comprising: based on the one or more radio resource control messages comprising the reporting of early state handling assistance information:
sending by the base station one or more messages to cause the user equipment to enter into the radio resource control connected state.

16. The apparatus as claimed in claim 15 wherein the receiving one or more radio resource control messages from the user equipment further comprises receiving the one or more radio resource control messages from the user equipment using one or more radio resource control setup or resume request messages.

17. The apparatus as claimed in claim 15 wherein the reporting of early state handling assistance information comprises one or more of the following:
a data amount field indicating an amount of data expected to be delivered during a current session and comprising one or more of the following: (i) "No data expected", "not that much data expected", "no DL and/or UL data expected"; or ii) "less than X bits expected", "a single data packet expected"; or iii) any combinations thereof;
a session length field indicating a length of the current session to be accommodated during a requested connection and comprise one or more of the following values: "short", "long", or "X seconds", where X is the length in seconds;
a data radio bearer preference field indicating whether the user equipment prefers or needs a data radio bearer for a data transmission to be performed in the current session;
a state preference field indicating a user equipment-preferred radio resource control state the user equipment prefers after data is transmitted in the current session; or
a state transition condition field indicating a user equipment-preferred radio resource control state after i) a certain amount of uplink and/or downlink data is transmitted, and/or ii) a connection used in the current session has lasted a certain amount of time; and
the determining by the base station to release the radio resource control connection for the user equipment uses one or more of fields in the indication of early state handling assistance information in the one or more radio resource control messages to determine to release the radio resource control connection for the user equipment.

* * * * *